United States Patent
Van Der Veen et al.

(10) Patent No.: US 7,486,198 B2
(45) Date of Patent: Feb. 3, 2009

(54) SYSTEM AND METHOD FOR PERFORMING TELEMETRIC MEASUREMENTS

(75) Inventors: Minne Van Der Veen, Eindhoven (NL); Alphons Antonius Maria Lambertus Bruekers, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 786 days.

(21) Appl. No.: 10/500,766

(22) PCT Filed: Dec. 9, 2002

(86) PCT No.: PCT/IB02/05328

§ 371 (c)(1), (2), (4) Date: Jul. 6, 2004

(87) PCT Pub. No.: WO03/059003

PCT Pub. Date: Jul. 17, 2003

(65) Prior Publication Data

US 2005/0108100 A1    May 19, 2005

(30) Foreign Application Priority Data

Jan. 9, 2002    (EP) .................................. 02075087

(51) Int. Cl.
G08C 19/22 (2006.01)
H04Q 9/00 (2006.01)

(52) U.S. Cl. .................. 340/870.07; 370/466; 702/127

(58) Field of Classification Search ............ 340/870.07; 370/466; 702/127; 379/106.03
See application file for complete search history.

(56) References Cited

U.S. PATENT DOCUMENTS

| | | | | |
|---|---|---|---|---|
| 5,862,803 A * | 1/1999 | Besson et al. ................ 600/508 |
| 5,873,369 A * | 2/1999 | Laniado et al. .............. 600/300 |
| 6,102,856 A * | 8/2000 | Groff et al. .................. 600/301 |
| 6,396,416 B1 * | 5/2002 | Kuusela et al. ......... 340/870.28 |
| 2002/0082665 A1 * | 6/2002 | Haller et al. .................. 607/60 |
| 2002/0169584 A1 * | 11/2002 | Fu et al. ...................... 702/188 |

FOREIGN PATENT DOCUMENTS

| | | |
|---|---|---|
| EP | 1132842 | 9/2001 |
| WO | WO 0113558 | 2/2001 |

* cited by examiner

*Primary Examiner*—Timothy Edwards, Jr.
(74) *Attorney, Agent, or Firm*—Michael E. Belk

(57) ABSTRACT

System for performing telemetric measurements, comprising a plurality of mobile communication devices (100), each communication device (100) being provided with at least one sensor (110) and a sensor control section (120) for performing measurements, a cellular communication network structure for the mobile communication devices, a server provided with communication means for receiving measurement data from the plurality of mobile communication devices (100), and for sending measurement instructions to respective sensor control sections (120) of the mobile communication devices (100) wherein the sensor control sections (120) are programmable by the server.

18 Claims, 1 Drawing Sheet

SYSTEM AND METHOD FOR PERFORMING TELEMETRIC MEASUREMENTS

Figure 1:
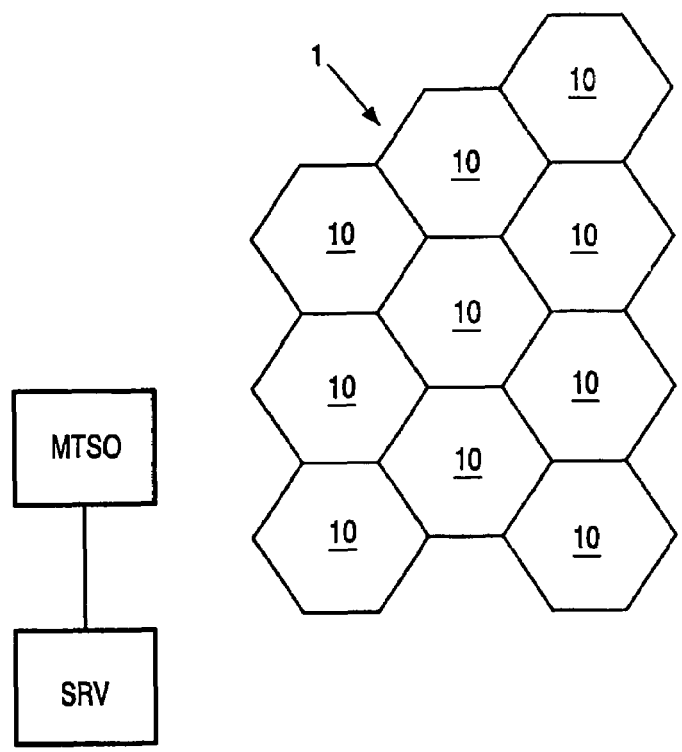

The invention relates to a system for performing telemetric measurements.

Telemetric measurements are used for in situ measurements of various parameters. By relaying the measurement data through telemetry, the infrastructure necessary for performing the measurements is significantly simplified. However, even in this situation the need for a measuring probe with communication equipment continues to exist. If many measurements are required, the cost of the measuring equipment is substantial, especially if measurements in various locations and/or at substantially the same instant are required.

It is an object of the invention to provide an improved system for telemetric measurements, and in particular a system that can be operated with less resources while maintaining the required measurement performance.

This object is achieved with a system according to claim 1. By using many communication devices, such as cell phones, as a telemetric observation platform, the number of potential measurement devices is very large. By using the infrastructure of the mobile communications network already in place, the costs for transmitting measurement data can be significantly reduced.

The invention further relates to a method for paying for measurements performed in a mobile communication network setting. By awarding credits for measurements made by the phone of a user, for instance by a lump sum reduction of the billed costs or a reduced rate, users will have an incentive to apply to the scheme, and to make more efforts to enable their phone to make the measurements when required. This will increase the effectiveness of the measurement system according to the invention.

Figure 2:
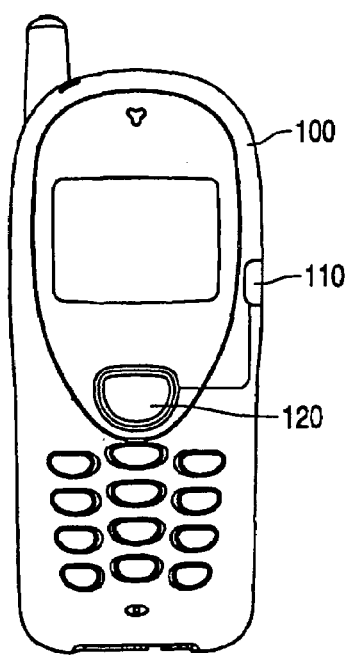

Particularly advantageous elaborations of the invention are set forth in the dependent claims. Further objects, elaborations, modifications, effects and details of the invention appear from the following description, in which reference is made to the drawing, in which:

FIG. 1 shows schematically a cellular communication network according to the invention, and FIG. 2 shows schematically a cellular telephone according to the invention.

In FIG. 1 a cellular communication network 1 is shown, with a plurality of adjacent hexagonal cells 10 that each represent the reach of a transmitting tower of a base station in the center of the cell. The network is further provided with a Mobile Telephone Switching Office (MTSO) that coordinates all communications within the cells and between other MTSOs of other sections of the communication network. The MTSO keeps track of the location of a mobile phone that is present within the reach of the network in a database stored within the MTSO. Typically, the MTSO is implemented in software on a computer system. For identification of the mobile telephone, the MTSO stores the Electronic Serial Number (ESN) of the telephone, the Mobile Identification Number (MIN) associated with the telephone number belonging to the telephone, and the System Identification Code (SID) associated with the communications service provider. For each mobile telephone, its position is at least known with an accuracy of the size of the cells used; if the telephones are equipped with a geographic positioning system (example is Global Positioning System (GPS)), the location of a telephone is known even more accurately. Information with respect to subscriber data such as identification data, and billing data is stored in database form in the MTSO.

According to the invention, a cell phone 100 is provided with a sensor 110 and a sensor control unit 120, see FIG. 2. The sensor 110 is adapted to perform a measurement, in that it is capable to convert a measured variable into a measurement signal. Non limiting examples of such a sensor are a temperature sensor, an air pressure sensor, an air pollution sensor, a humidity sensor, and a speed sensor. The sensor control unit 120 is adapted to initiate a measurement by reading and storing a measurement signal from the sensor 110. For storing measurement data the sensor control unit is provided with a memory. Furthermore, the sensor control unit is adapted to send measurement data using the communication device to a server. In particular, the control unit is equipped to include the measurement data in data communication stream such as for example telephone conversation data. Methods of including a one or more signals in a main signals are known in the art, both for analogue or digital signals. Corresponding methods of decoding encoded signals are equally well known. Measurement data can include for example one or more measurement signals, time stamps, location data, and user identification data.

According to the invention is provided a server SRV (see FIG. 1), for example being implemented in a computer system, that is adapted to receive measurement information from the cell phones. To this end, the server SRV can be communicatively connected to the MTSO, or be connected to the network through other means. To receive a measurement, measurement data that has been included in a communication stream has to be detected and decoded. The detection and decoding has to be performed according to the encoding method used, and can therefore include operations such as filtering and demultiplexing. Decoded measurements are subsequently processed for further use, by for example storing the data in a database or outputting it as a data stream.

The system according to the invention can be used in various ways. A number of non limiting examples are referred to hereinafter.

In a first embodiment of the invention, the mobile communication devices are programmed to make a measurement, for example air pressure, on predetermined point in time, for instance 12:00 AM, and store the information within the sensor control unit. When a mobile communication device uses the network to establish a connection, the sensor control unit sends out the measurement data (preferably including the position of the communication device at the time of the measurement) so that the server can collect the data. As a result, measurement data of many communication devices can be gathered, giving many data point for, in this example the air pressure, on a specific point in time at a specified location.

In another embodiment the sensor control units are programmed to take a measurement when the device they are associated with reach a predetermined location. The location can be specified in terms of a absolute position (such as GPS coordinates) or a network related position, such as a cell. When the communication device reaches the location, the sensor control unit makes a measurement, and stores it. In subsequent communication, the data is transferred to the server. In this way data for a specific location can be gathered. In a variation on the location triggered measurement, the communication device can be provided with sensors that detect trigger signals by external source, for example a radio beacon.

In a further embodiment of the invention, the server is provided with means to instruct specific sensor control units to perform a measurement, and to send the results to the server. Preferably only instructions are send to communication devices that are actively communicating, so that the instructions and the measurements can be send in real time. In this embodiment of the invention, real time measurements can be performed over a larger number of measurement locations. Additionally, sensor control units can be selected according to their location, so that real time measurements can be obtained from a specific location or area.

The sensor control unit can be arranged to perform a measurement based on several triggers. For example, the proximity to a specific location triggers a measurement. The detection of the location can be made by the phone itself, based on a pre-programmed location and GPS measurements made by the phone. Also the phone can receive a trigger signal from an external source present at the location, such as a transmitter.

In a further aspect of the invention, the subscriber to the telecommunication network can receive credits for supplying measurements. In case a measurement is successfully transferred to the server, a credit can be awarded to the user of the phone. This credit can be for example in the form of a reduction in the costs of the connection made. The credits awarded can be stored in a user data base, for example one present in the server. Although in the above-mentioned examples a cell phone is used, is the invention not limited to a cell phone. The invention can be used with any mobile communication device, such as a personal digital assistant, that is provided with communication equipment to communicate over a cellular communication network.

The actual sensor used need not be an integral part of the communication device as such. The sensor can also be releasably connectable to the communication device. In particular a sensor provided in a vehicle, such as a car, can be connected to a communication device according to the invention. The vehicle sensors include temperature and speed sensors. In one specific embodiment vehicle speed can be measured, the measurement being triggered by the proximity to a specific measurement point, like a point where traffic jams are common. Data acquired in this way can be used for traffic control purposes.

The invention claimed is:

1. A system for performing telemetric measurements, the system comprising:
   a plurality of mobile communication devices, configured for use with a cellular communications network,
   each mobile communication device comprising at least one sensor and a sensor controller for performing measurements; and
   a server for receiving measurement data from said plurality of mobile communication devices, and for sending measurement instructions to respective sensor control sections of said plurality of mobile communication devices,
   wherein the measurement instructions are only sent to sensor control sections of mobile communication devices actively communicating over the cellular communications network.

2. The system according to claim 1, wherein each of the sensor controllers is configured to perform a measurement at a predetermined point in time.

3. The system according to claim 1, wherein each of the sensor controllers is configured to perform a measurement in response to the measurement instructions received from the server.

4. The system according to claim 1, wherein each of the sensor controllers is configured to transmit the measurement data when the respective mobile communication device establishes a connection over the network.

5. A mobile communication device for use in a system according claim 1, comprising a communication section for communication over a cellular communications network, and at least one sensor and a sensor controller for performing measurements.

6. The system according to claim 1, wherein the measurement data is sent in real time.

7. The system according to claim 1, wherein the measurement instructions are only sent to sensor control sections of mobile communication devices within a specified area.

8. The system according to claim 1, wherein the measurement instructions comprise an instruction to measure at least one of a temperature, an air pressure, humidity and air pollution.

9. The system according to claim 1, wherein each of the sensor controllers is programmable by the server.

10. The system according to claim 9, wherein each of the sensor controllers is configured to perform a measurement at a predetermined point in time.

11. The system according to claim 9, wherein each of the sensor controllers is configured to transmit the measurement data when the respective mobile communication device establishes a connection over the network.

12. A method for performing telemetric measurements, the method comprising:
   instructing a sensor controller of a mobile communication device to perform a measurement; and
   retrieving measurement data resulting from the measurement from the mobile communication device through a cellular communication network,
   wherein instructing the sensor controller to perform the measurement is at least based on a position of the mobile communication device within the cellular communication network.

13. The method according to claim 12, wherein the measurement data is retrieved when the mobile communication device is communicating over the cellular communication network via a communication signal.

14. The method according to claim 13, wherein the measurement data is encoded in the communication signal.

15. The method according to claim 12 wherein instructing the sensor controller to perform the measurement is at least based on whether the mobile communication device is currently communicating over the cellular communication network.

16. The method according to claim 15, wherein the measurement data is retrieved in realtime when the mobile communication device is currently communicating over the cellular communication network.

17. A method for billing communication costs to a subscriber to a network communication service within a cellular communication network, the method comprising:
   sending an instruction through the communication network to a mobile communication device associated with the subscriber to collect measurement data;
   receiving the measurement data from the mobile communication device through the communication network; and
   awarding credit towards billing information of the subscriber for receiving the measurement data from the mobile communication device.

18. The method according to claim 17, wherein sending the instruction to collect measurement data is based on at least one of a position of the mobile communication device within the communication network and whether the mobile communication device is currently communicating over the communication network.

* * * * *